United States Patent [19]

Friedman

[11] 4,052,319

[45] Oct. 4, 1977

[54] COOKING OIL FILTRATION

[76] Inventor: Bernard Friedman, 2730 Chew St., Allentown, Pa. 18104

[21] Appl. No.: 627,904

[22] Filed: Nov. 3, 1975

[51] Int. Cl.² .................. B01D 35/02; B01D 23/20
[52] U.S. Cl. ...................... 210/465; 99/408; 210/471; 210/474; 210/DIG. 8
[58] Field of Search .............. 210/464, 465, 471, 473, 210/470, 474, 167, 495, 500 R, 505, 507, DIG. 8; 99/408, 410–415; 55/378, 380, 497, 500, 508, 511, 527–529

[56] References Cited

U.S. PATENT DOCUMENTS

| | | | |
|---|---|---|---|
| 1,547,761 | 7/1925 | Kloehn | 210/495 |
| 1,823,365 | 9/1931 | Kozlowski | 55/529 |
| 2,610,740 | 9/1952 | Hunter | 99/408 |
| 2,658,444 | 11/1953 | Wheeler | 99/410 |
| 3,246,767 | 4/1966 | Pall et al. | 210/505 |
| 3,616,934 | 11/1971 | Ehrlich | 210/474 |
| 3,651,947 | 3/1972 | Schollhamer | 210/474 |
| 3,762,564 | 10/1973 | Weedon et al. | 210/505 |
| 3,765,536 | 10/1973 | Rosenberg | 210/507 |

Primary Examiner—Tim R. Miles
Assistant Examiner—Gregory N. Clements
Attorney, Agent, or Firm—Marn & Jangarathis

[57] ABSTRACT

Filter for cooking oil formed of polyester or polytetrafluoroethylene having specific characteristics. The filter is removably supported on a frame which permits easy replacement of the filter.

9 Claims, 9 Drawing Figures

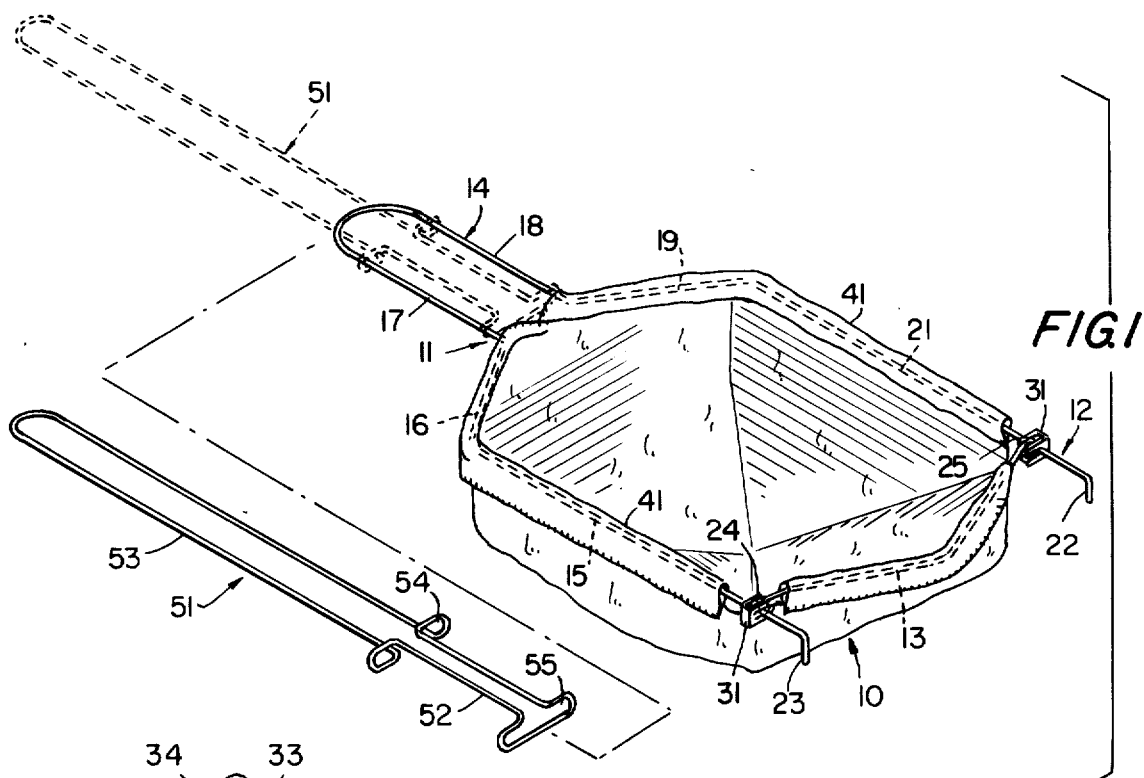
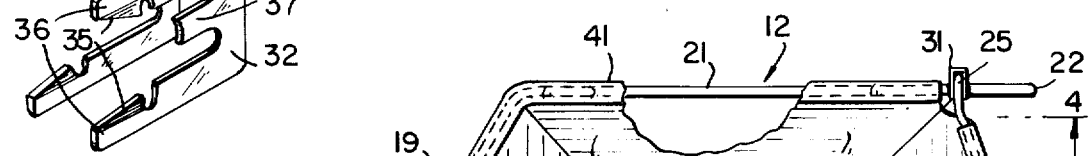
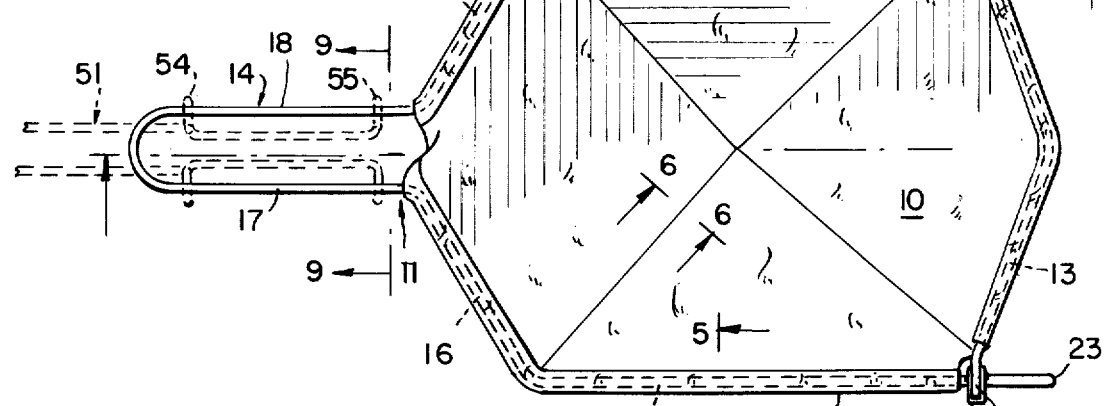

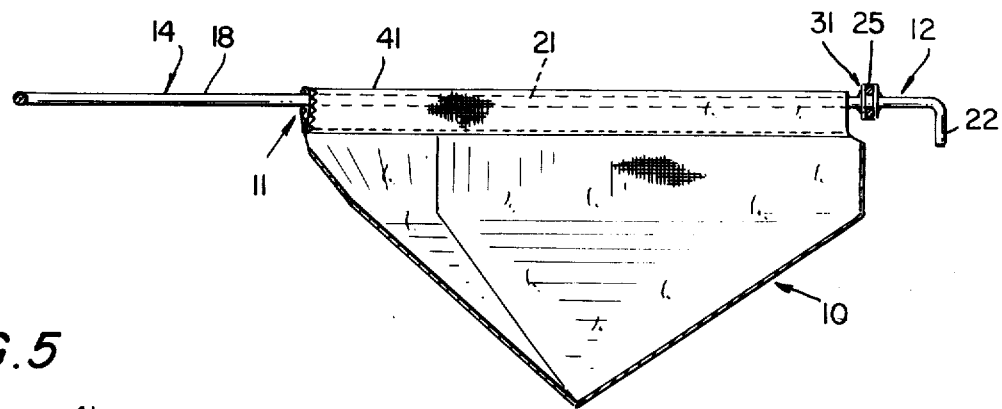
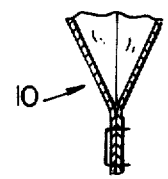
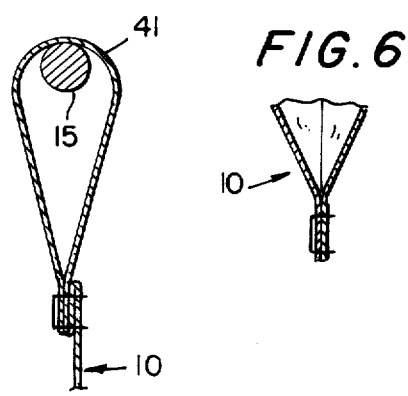
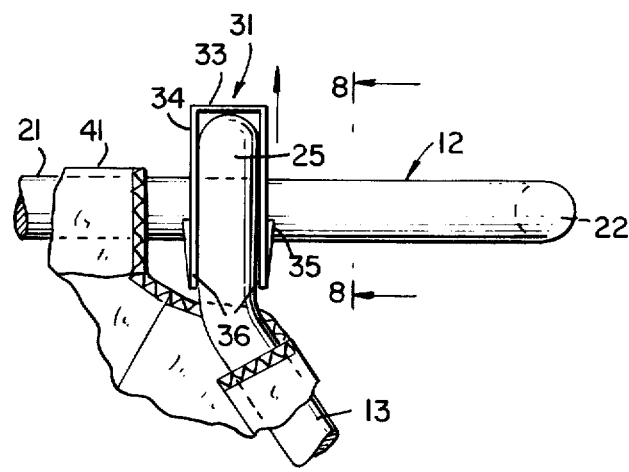
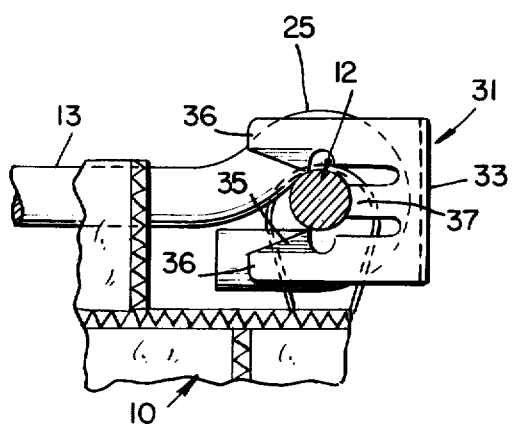
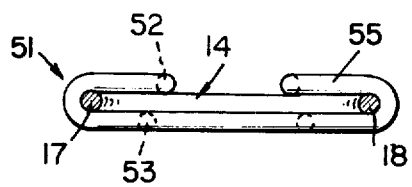

COOKING OIL FILTRATION

The invention relates to the filtration of cooking oil.

Cooking oil employed for the cooking of various foods is periodically filtered, in order to remove accumulated particles. The filters employed to date have generally been throw-away paper filters, which have had only a limited amount of effectiveness for such purposes. Accordingly, there is a need for improved filtration of cooking oils.

An object of the present invention is to provide for improved filtration of used cooking oil.

Another object of the present invention is to provide for a new and improved filter structure suitable for filtration of cooking oils.

A further object of the invention is to provide an improved method of filtering used cooking oil.

These and other objects of the invention should be apparent from reading the following description thereof.

In accordance with one aspect of the present invention, there is provided improved filtration of cooking oils by employing a filter formed from a polyester or polytetrafluoroethylene capable of withstanding the heat encountered in the filtration of a hot cooking oil, and which has a uniform pore size in the order of from about 40 to about 60 microns, preferably about 50 microns and an open area of from about 20 to about 30% of the total area. The combination of the aforesaid properties provide for improved filtration of a used cooking oil.

The filter is generally in the form of a fabric which is formed from threads of the material which are heat sealed to each other. The heat sealing functions to maintain the properties of the material; i.e., uniform pore size.

In accordance with another aspect of the present invention, there is provided a new and improved filter structure for effecting filtration of cooking oils which is comprised of a filter support and a filter bag removably secured thereto.

The invention will be further described with respect to the drawings wherein:

FIG. 1 is an isometric view of an embodiment of the filter of the present invention;

FIG. 2 is a top view of the filter of FIG. 1;

FIG. 3 is an exploded view of the clip used in the filter of FIG. 1;

FIG. 4 is a sectional view along line 4—4 of FIG. 2;

FIG. 5 is a partial sectional view along line 5—5 of FIG. 2;

FIG. 6 is a partial section along line 6—6 of FIG. 2;

FIG. 7 is a top detailed view of a portion of the filter of FIG. 1;

FIG. 8 is a partial sectional view along line 8—8 of FIG. 7; and

FIG. 9 is a sectional view along line 9—9 of FIG. 2;

Referring now to the drawings, there is shown a filter bag 10 supported by a filter support, generally designated as 11.

The filter support 11 is comprised of a first rod member 12 and a second rod member 13 which is removably secured to the first rod member 12. The first rod member 12 is shaped to provide the main portion of the support, including an integral U-shaped handle 14. The rod member 12 includes: a first portion 15, which defines a first side portion of the support; a second portion 16, which extends angularly inwardly from and in the same plane as the first portion 15 to define a portion of a first end portion of the support; a third portion 17 which is essentially parallel to and in the same plane as the first portion 15 to provide a first leg of the generally U-shaped integral handle 14; a fourth portion 18 in the same plane as and opposite and essentially parallel to the third portion 17 to define a second leg of the U-shaped integral handle 14; a fifth portion 19, which extends angularly outwardly from and in the same plane as the fourth portion 18 to define a second portion of the first end portion of the support; and a sixth portion 21, in the same plane as and opposite and essentially parallel to the first portion 15 to define a second side portion of the support 11. The rod member 12 has downwardly bent ends 22 and 23 which function as hooks to support the filter on the rim of a vessel for receiving filtered cooking oil.

The second rod member 13 has hook shaped ends 24 and 25, which are hooked around the first portion 15 and sixth portion 21 of the first rod member 12 to define a second end portion of the support opposite to the first end portion. The hooked end portions 24 and 25 of the second rod member 13 are maintained in position on the first rod member 12 by a pair of metal retaining clips, generally designated as 31.

Referring to FIG. 3, the retaining clips 31 have a generally U-shape and are comprised of a first leg 32, a base 33 and a second leg 34 opposite and parallel to the first leg 32. The legs 32 and 34 are each provided with a downwardly extending, inwardly converging portion 35 which defines a pair of gripping fingers 36 for releasably engaging the first rod member 12. The legs are further provided with upwardly extending tabs 37 which define a stop or limit member upon insertion of the first rod member 12 into the recessed portion 35. The clips 31 are formed of a material whereby the rod member 12 can be force fitted into the recess 35 so that the fingers 36 firmly grip the rod member 12 and whereby the fingers can be spread, by exertion of a force, to release the clip 31 from the rod member 12.

The rod member 13 is retained on the rod member 12 by inserting the hooked ends 24 and 25 into the space between the legs 32 and 34 of the clip 31 and forcing the rod member 12 into the recessed portions 35 of the clip 31 whereby the fingers 36 firmly grip the rod member 12, whereby movement of the rod member 13 is restrained by the restraint placed on movement of the hooked end portions 24 and 25 by the legs 32 and 34 of the clip 31 and the rod member 12.

The filter bag 10 is provided with sleeve portions, generally designated as 41, which are slipped over the rod members 12 and 13 to thereby support the filter bag 10. The filter bag 10 as shown is in the form of a tetrahedron; however, although such a shape is preferred, other shapes can be employed.

The filter bag 10 can be easily removed from the support 11 by releasing the clips 31 from the rod member 12 thereby permitting unhooking of the rod member 13 from the rod member 12. The filter bag 10 may be removed from the support 11 by removing rod member 13 from the sleeve portion 41 of the bag 10, followed by sliding the filter bag 10 from one side portion of rod member 12 over the handle 14 and off of the other side portion of rod 12.

The filter bag 10 may be further provided with a stirrer 51 for effecting movement of sludge from the filter surface during filtration. The stirrer 51 is formed of a single rod 52 to provide a generally U-shaped stirring portion 53 and a pair of loop portions 54 and 55 which are shaped to fit over the handle 14 of the support 11 whereby the stirrer can be supported and stored with the filter by the filter handle 14 when the filter is not in use.

As hereinabove indicated for optimum results, the filter bag is formed of a smooth surfaced polyester or polytetrafluoroethylene which can withstand the elevated temperatures encountered in filtering hot cooking oil (generally in the order of 325° to 375° F) and which has the characteristics hereinabove described. The filter is preferably polyester; e.g., MYLAR polyester. The use of such a filter bag provides more effective filtering and can be easily cleaned (washing with hot water) for reuse thereof. The use of the present filter provides for reduced filtration time and free filtering without clogging. In addition, as a result of the improved filtration effectiveness, the useful life of the cooking oil is extended and the quality of the food cooked in the oil is improved.

Numerous modifications and variations of the present invention are possible in light of the above teachings and, therefore, within the scope of the claims, the invention may be practiced otherwise than as particularly described.

What is claimed is:

1. A filter for cooking oil, comprising:
a filter support, said filter support being comprised of a first member having a first side portion, a second side portion opposite said first side portion, a first end portion and a handle portion extending from said first end portion, said first member being formed of a single first rod, and a second member in the form of a second rod extending between said first and second side portions to define a second end portion opposite to said first end portion, said second rod member including first and second hooked end portions said first hooked end portion being hooked around the first side portion of said first rod member and the second hooked portion being hooked around the second side portion of said first rod member; means for retaining the second member in position between said first and second side portions, said means for retaining the second rod member in position being comprised of first and second clips for receiving said hooked portions, said clips being removably secured to said first and second rod portions to prevent unhooking of said hooked portions from the first rod member; and
a filter bag, said filter bag being removably supported on said filter support, said filter bag including sleeve portions, said first and second members being inserted into said sleeve portions to thereby removably support said filter bag.

2. The apparatus of claim 1 wherein each of said first and second clips are U-shaped clips comprised of a first leg, a base and a second leg, said hooked portions being received in the space between the first and second legs, said first and second legs each containing a recessed portion to define gripping fingers for releasably engaging said first and second rod portions.

3. The filter of claim 1 wherein the filter bag is formed from a member selected from the group consisting of polyesters and polytetrafluoroethylene, said filter bag having a uniform pore size of from about 40 to about 60 microns and an open area of from about 20% to about 30% of the total area.

4. The filter of claim 1 and further comprising a stirrer formed of a single rod, said single rod including loop portions which fit over the handle portion of said filter support for storing the stirrer with the filter.

5. The filter of claim 1 wherein the first rod has hooked ends opposite said handle.

6. A filter for an open top vessel, comprising:
a filter support, said filter support being comprised of a first rod and second rod, said first rod being bent to provide spaced elongated first and second opposite sides which converge and form an integral handle, said second rod having first and second ends, said second rod extending between the sides of the first rod opposite said integral handle, first and second means removably securing the first and second ends of the second rod to the first and second opposite sides of the first rod; and
a tetrahedrally shaped filter bag having an open top, first and second side walls, a front wall and rear wall converging to form a closed filter bag bottom, said filter bag at the open top including first, second and third support means for removably supporting the filter bag on said filter support, said first support means extending along said first side wall and a portion of the rear wall and being removably supported on said first side of the first rod including the converging portion, second support means extending along the second side wall and a portion of the rear wall and being removably supported on said second side of the first rod including the converging portion, said third support means extending along said front wall and being removably supported on the second rod whereby the filter bag can be supported in a spread open position and can be removed from the support by removing the second rod from the first rod.

7. The filter of claim 6 wherein the filter bag is formed from a member selected from the group consisting of polyesters and polytetrafluoroethylene, said filter bag having a uniform pore size of from about 40 to about 60 microns and an open area of from about 20 to about 30% of total area.

8. The filter of claim 6 wherein the filter bag is a fabric formed from heat sealed threads of a member selected from the group consisting of polyesters and polytetrafluoroethylene.

9. The filter of claim 6 wherein the first rod has hooked ends opposite the handle.

* * * * *